(12) United States Patent
Streinz

(10) Patent No.: US 12,365,416 B2
(45) Date of Patent: Jul. 22, 2025

(54) SKI BIKE AND SKI BIKE CONVERSION KIT

(71) Applicant: Daniel Elliot Streinz, Duluth, MN (US)

(72) Inventor: Daniel Elliot Streinz, Duluth, MN (US)

( * ) Notice: Subject to any disclaimer, the term of this patent is extended or adjusted under 35 U.S.C. 154(b) by 320 days.

(21) Appl. No.: 18/194,070

(22) Filed: Mar. 31, 2023

(65) Prior Publication Data
US 2023/0322324 A1 Oct. 12, 2023

Related U.S. Application Data

(60) Provisional application No. 63/329,611, filed on Apr. 11, 2022.

(51) Int. Cl.
*B62K 13/00* (2006.01)
*B62K 25/00* (2006.01)

(52) U.S. Cl.
CPC .............. *B62K 13/00* (2013.01); *B62K 25/00* (2013.01)

(58) Field of Classification Search
CPC ........ B62K 13/00; B62K 25/00; B62K 3/002; B62K 13/08; B62B 13/12; B62B 13/04; B62B 13/10; B62B 17/04; B62B 17/062; B62B 17/065; B62B 13/046; B62B 13/08; B62B 13/18; B62B 2206/006; B62B 13/00; B62B 13/16; B62B 17/00; B62B 17/005; B62B 17/06; B62B 17/063; B62B 19/02; B62B 2205/006; B62B 13/043; B62B 13/06; B62B 2301/00; B62M 2027/022; B62M 2027/021; B62M 27/00; B62M 29/00
USPC ....................................................... 280/7.12
See application file for complete search history.

(56) References Cited

U.S. PATENT DOCUMENTS

| | | | | |
|---|---|---|---|---|
| 3,297,335 | A * | 1/1967 | Ogata | B62B 13/10 280/16 |
| 3,398,970 | A * | 8/1968 | Horiuchi | B62B 13/12 280/16 |
| 3,799,565 | A * | 3/1974 | Burtis | B62M 29/00 280/282 |
| 3,870,330 | A * | 3/1975 | Hatano | B62B 13/04 280/16 |
| 4,027,891 | A * | 6/1977 | Frame | B62B 13/04 280/7.14 |
| 4,796,902 | A * | 1/1989 | Capra | B62B 13/10 280/22.1 |
| 6,626,441 | B1 * | 9/2003 | Hanson | B62K 13/00 280/7.17 |
| 6,783,134 | B2 * | 8/2004 | Geary | B62B 13/16 280/22.1 |
| 7,438,297 | B2 * | 10/2008 | Fernandez | B62K 13/00 280/220 |

(Continued)

*Primary Examiner* — James A Shriver, II
*Assistant Examiner* — Hilary L Johns
(74) *Attorney, Agent, or Firm* — Christopher C. Streinz

(57) ABSTRACT

A ski bike and conversion kit for converting a conventional bicycle to a ski bike include at least a rear ski assembly configured to replace a rear wheel of the bicycle. The rear ski assembly includes first and second ski mounts configured to receive corresponding first and second skis. The ski mounts are deployed on a frame that is configured to couple the ski mounts to the bicycle in place of the rear wheel. The frame and ski mounts are rotatably connected to one another and configured such that tilting the ski bike (e.g., to steer) causes the first and second ski mounts to tilt at corresponding angles that are greater than the tilt of the ski bike.

20 Claims, 4 Drawing Sheets

(56) References Cited

U.S. PATENT DOCUMENTS

| | | | | |
|---|---|---|---|---|
| 7,726,667 B2 * | 6/2010 | Ferron | .................... | B62K 3/002 |
| | | | | 280/21.1 |
| 7,762,564 B2 * | 7/2010 | Stene-Johansen | ...... | B62B 13/12 |
| | | | | 280/22.1 |
| 7,896,362 B1 * | 3/2011 | Scatchard | .............. | B62K 13/00 |
| | | | | 280/7.14 |
| 9,776,653 B2 * | 10/2017 | Marrder | ................ | B62B 17/065 |
| 10,220,870 B2 * | 3/2019 | Bassein | .................. | B62K 13/08 |
| 10,252,740 B2 * | 4/2019 | Pierce | .................... | B62B 17/04 |
| 11,807,330 B2 * | 11/2023 | Bank | ....................... | B62K 11/04 |
| 2001/0038184 A1 * | 11/2001 | Stafford | .................. | B62B 13/06 |
| | | | | 280/845 |
| 2004/0100044 A1 * | 5/2004 | Monike | ................... | B62B 17/08 |
| | | | | 280/14.1 |
| 2006/0197294 A1 * | 9/2006 | Yau | ........................ | B62B 13/043 |
| | | | | 280/16 |
| 2007/0257452 A1 * | 11/2007 | Stene-Johansen | ...... | B62B 13/12 |
| | | | | 280/16 |
| 2008/0029324 A1 * | 2/2008 | Plankenhorn | ........... | B62B 13/08 |
| | | | | 280/22.1 |
| 2010/0109267 A1 * | 5/2010 | Leycraft | ................. | B62B 13/04 |
| | | | | 280/21.1 |
| 2014/0191482 A1 * | 7/2014 | Bassein | .................. | B62K 13/00 |
| | | | | 280/15 |
| 2015/0353117 A1 * | 12/2015 | Peng | ....................... | B62B 13/10 |
| | | | | 280/14.21 |
| 2017/0057534 A1 * | 3/2017 | Marrder | ................ | B62B 17/065 |
| 2017/0291630 A1 * | 10/2017 | Bassein | .................. | B62B 17/00 |
| 2018/0086360 A1 * | 3/2018 | Pierce | .................... | B62B 17/062 |

\* cited by examiner

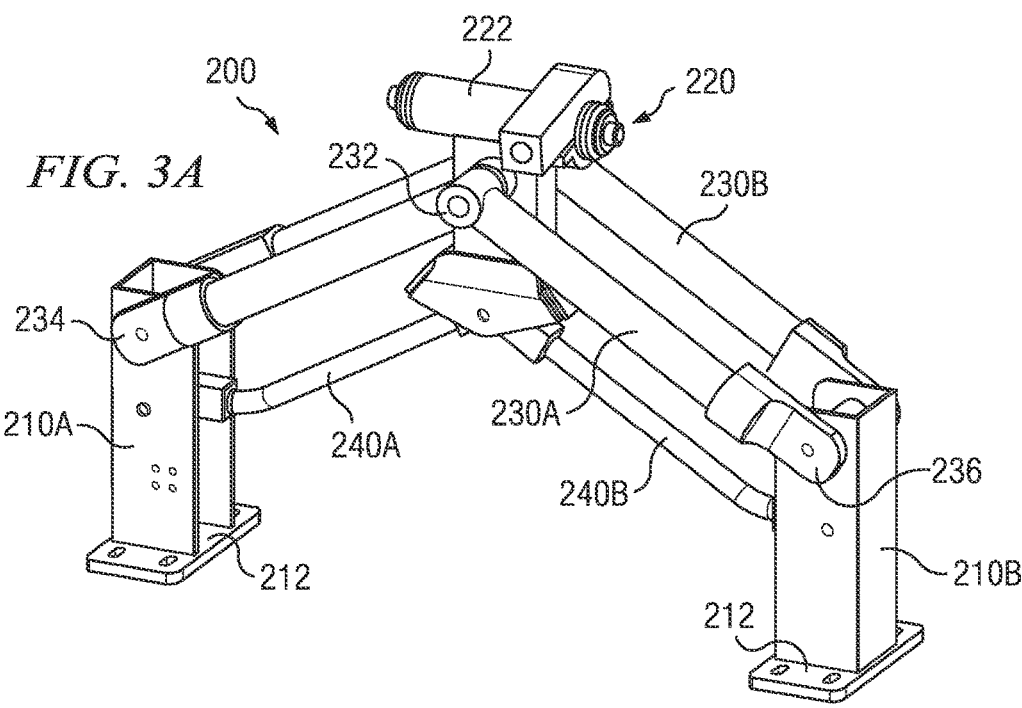
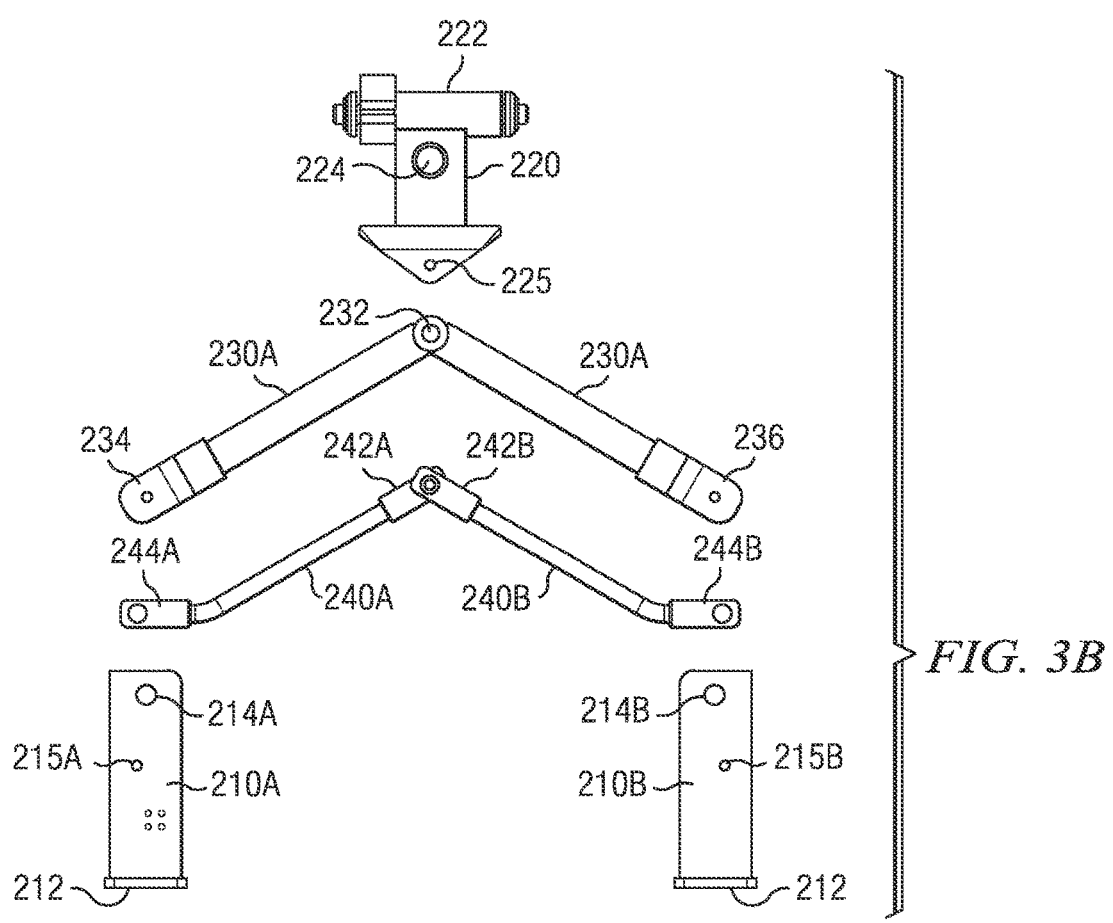

SKI BIKE AND SKI BIKE CONVERSION KIT

CROSS REFERENCE TO RELATED APPLICATIONS

This application claims priority to U.S. Provisional Patent Application 63/329,611, entitled SKI BIKE AND SKI BIKE CONVERSION KIT, which was filed on Apr. 11, 2022 and is incorporated herein by reference in its entirety.

TECHNICAL FIELD

Disclosed embodiments relate generally to a ski bike and a ski bike conversion kit, for example, a kit for converting a conventional bicycle to a ski bike in which the kit includes front and back ski assemblies configured to replace the front and back wheels of the bicycle.

BACKGROUND OF THE INVENTION

Downhill skiing (alpine skiing) and biking (both road and off-road or mountain biking) are common recreational pursuits. In recent years downhill ski biking has increased in popularity. Downhill ski biking attempts to combine the attributes of downhill skiing and downhill mountain biking into a single activity. In general, a rider rides a ski bike that includes a frame, a seat, a steering mechanism (handles) and skis mounted to the frame down a snow or ice covered slope.

While descending a hill on a ski bike, steering can be accomplished by turning the ski bike handles and/or leaning the bike into a turn. Such steering causes the skis to cut (or carve) the snow and thereby turn the bike. One difficulty with available ski bikes is that it is not generally possible for a rider to tip or tilt the ski bike sufficiently to enable the skis to aggressively cut the snow. Available ski bikes are therefore generally limited to easy or moderate terrain and/or slower speeds that don't require such aggressive cutting of the snow. There is a need for a ski bike that is capable of being used in more aggressive and difficult terrain and/or conditions.

Available ski bikes also tend to be expensive. There is also a need for a lower cost ski biking option such as a conversion kit for converting a conventional bicycle to a ski bike.

SUMMARY OF THE INVENTION

A ski bike and a conversion kit for converting a conventional bicycle to a ski bike are disclosed. The kit and ski bike include at least a rear ski assembly configured to replace a rear wheel of the bicycle. The rear ski assembly includes first and second ski mounts configured to receive corresponding first and second skis. The ski mounts are deployed on a frame that is configured to couple the ski mounts to the bicycle in place of the rear wheel. The frame and ski mounts are rotatably connected to one another and configured such that tilting the ski bike (e.g., to steer) causes the first and second ski mounts to tilt at corresponding angles that are greater than the tilt of the ski bike.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 3A and 3B (collectively FIG. 3) depict perspective (3A) and partially exploded (3B) views of the rear ski assembly shown on FIG. 1.

DETAILED DESCRIPTION

Figure 1:
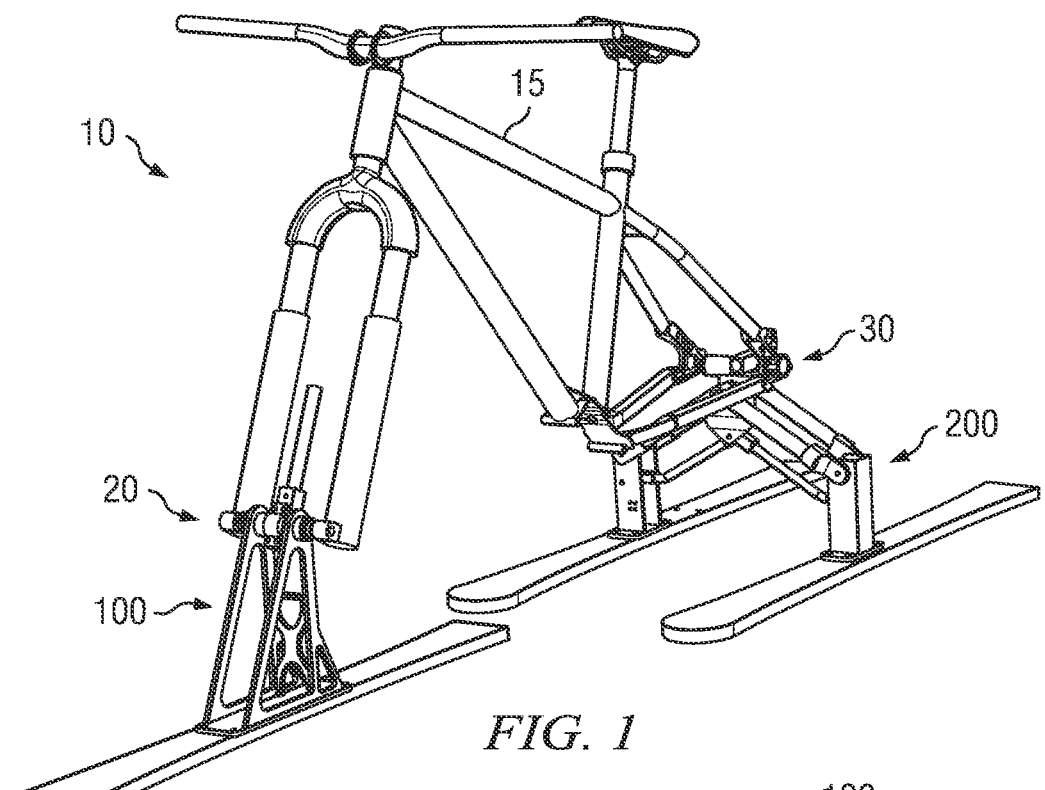
FIG. 1 depicts a perspective view of a conventional bicycle frame deployed on front and back ski assemblies.

A ski bike and a conversion kit for converting a conventional bicycle to a ski bike are disclosed. The kit and ski bike include at least a rear ski assembly configured to replace a rear wheel of the bicycle. The rear ski assembly includes first and second ski mounts configured to receive corresponding first and second skis. The ski mounts are deployed on a frame that is configured to couple the ski mounts to the bicycle in place of the rear wheel. The frame and ski mounts are rotatably connected to one another and configured such that tilting the ski bike (e.g., to steer) causes the first and second ski mounts to tilt at corresponding angles that are greater than the tilt of the ski bike. The ski bike and kit may further include a front ski assembly configured to replace the front wheel of the bicycle.

In one example embodiment, the rear ski assembly includes first and second ski mounts configured to receive corresponding first and second skis in which each of the ski mounts includes corresponding first and second, upper and lower ski mount bores. The rear ski assembly further includes an axle weldment having an axle housing configured to receive a rear wheel axle of the bicycle such that the rear ski assembly is deployable on the bicycle in place of the rear wheel. The axle weldment includes first and second, upper and lower weldment bores. An angled rear support frame couples the ski mounts to the axle weldment. A vertex of the frame is rotatably coupled to the axle weldment at the upper weldment bore while first and second opposing ends of the frame are rotatably coupled with the corresponding first and second ski mounts at the corresponding upper ski mount bores. The rear ski assembly further includes first and second control arms rotatably coupled to the ski mounts and the axle weldment. First ends of each of the control arms are rotatably coupled to one another and to the axle weldment at the lower weldment bore. Second opposing ends of the control arms are rotatably coupled to the corresponding first and second ski mounts at the corresponding lower ski mount bores. In certain embodiments a distance between the upper and lower weldment bores is greater than a distance between the upper and lower ski mount bores. Moreover, the lower ski mount bores may optionally be laterally offset from the upper ski mount bores. The ski bike and conversion kit may further include a front ski assembly configured to replace a front wheel of the bicycle.

The disclosed embodiments may advantageously provide a kit for a ski bike including front and rear ski assemblies that replace the front and back wheels of a conventional bicycle. Such a conversion kit may be advantageous in that it may significantly reduce the cost of a ski bike. The kit may be further advantageous in that it may provide a higher quality ski bike at a lower cost. For example, the use of the disclosed conversion kit may advantageously utilize the frame and the front and rear (or seat) suspension built into a conventional downhill mountain bike. The frame and suspension may be of a high quality and may therefore provide for an improved ski bike. The conversion kit may further advantageously make use of conventional downhill skis that may be deployed on the front and rear ski assemblies. Such skis may also be of a high quality (e.g., including high quality edges) and may therefore provide for an improved ski bike.

The disclosed ski bike (and conversion kit) may further advantageously enable a ski bike to be utilized in aggressive terrain (e.g., steep terrain or terrain including hard packed snow and/or ice). For example, the disclosed embodiments enable the skis to achieve high cutting angles without having to severely tip or tilt the ski bike. Such a configuration may therefore improve the performance, versatility, and rideability of the ski bike by enabling sharper cornering and carving.

FIG. 1 depicts a ski bike 10 including front 100 and rear 200 ski assemblies deployed on a conventional bicycle frame 15 in place of the front and back wheels (as indicated at 20 and 30). The bicycle frame 15 may include substantially any suitable frame, including road and mountain bike frames. However, the disclosed ski bike conversion kit is particularly well suited for use with mountain bikes and downhill mountain bikes. It will be appreciated that the ski bike 10 (and frame 15) shown on FIG. 1 does not depict peddles. This is for ease of illustration and is not intended to limit the disclosed embodiments in anyway. Those of ordinary skill in the art will readily appreciate that the disclosed conversion kit is generally used with a bicycle including handlebars, a seat, and peddles.

In the embodiment depicted on FIG. 1, first and second skis are coupled (attached or mounted) to the rear ski assembly 200 while a single ski is coupled to the front ski assembly 100. The ski bike may employ substantially any suitable skis, for example, including downhill skis, alpine skis, freestyle skis, back country skis, or cross country skis. The disclosed embodiments are not limited in this regard.

Figure 2:
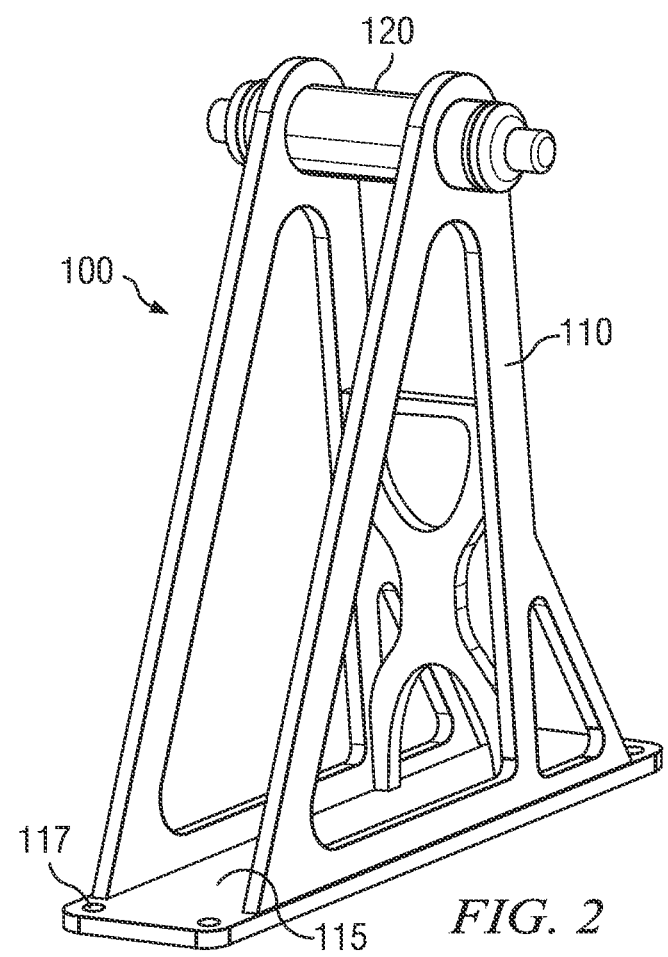
FIG. 2 depicts a perspective view of the front ski assembly shown on FIG. 1.

FIG. 2 depicts a perspective view of one example embodiment of a front ski assembly 100. The depicted assembly 100 includes a frame 110 (e.g., constructed from an aluminium alloy or other strong, lightweight material such as a carbon composite). A mounting plate 115 is deployed on the frame and is configured for receiving a ski (in other words the plate 115 may be coupled to the ski). The plate 115 may include holes 117 suitable for screwing the plate to the ski. Alternatively, the plate may be sized and shaped such that it may be received by a ski binding. For example, while not depicted as such, the plate 115 may be size and shaped similarly to an alpine (or type of) boot sole such that it may be attached to the ski in the same manner as a conventional ski boot. The disclosed embodiments are of course not limited in these regards.

With continue reference to FIG. 2, the front ski assembly 100 includes an axle housing 120 on the frame 110 that is configured to receive the front wheel axle of the bicycle. The housing 120 may include, for example, a cylinder or tube sized to receive the axle. The following procedure may be followed to deploy the front ski assembly on the bicycle. First, the front wheel may be removed from the bike and the axle removed from the wheel. The axle may then be deployed in the housing 120 and reconnected to the bike frame 15 thereby deploying the front ski assembly 100 on the bike frame. A ski may be mounted on the plate (or the plate mounted on the ski) at any time either prior to or after deploying the front wheel assembly on the bicycle.

FIGS. 3A and 3B (collectively FIG. 3) depict perspective and partially exploded views of one example embodiment of a rear ski assembly 200. The depicted assembly includes first and second laterally spaced apart ski mounts 210A and 210B configured to receive corresponding first and second skis (not shown). For example, as described above with respect to FIG. 2, each ski mount 210A and 210B may include a corresponding plate 212 configured to receive the corresponding ski. These plates 212 may include holes for screwing the plate to the ski or may alternatively be sized and shaped for mounting to a conventional ski binding. Each ski mount 210A and 210B may further include first and second, upper and lower bores 214A, 214B and 215A, 215B. As described in more detail below the lower bore 215A, 215B may include an elongated bore (or slot).

The rear ski assembly 200 may further include an axle weldment 220 including an axle housing 222 configured (e.g., sized and shaped) to receive the rear wheel axle of the bicycle. The housing 222 may include, for example, a cylinder or tube sized to receive the axle. As described above with respect to the front ski assembly, the rear ski assembly may be deployed on the bicycle by first removing the rear wheel from the bike and the rear axle from the wheel. The rear axle may then be deployed in the housing 222 and reconnected to the bike frame 15 thereby deploying the rear ski assembly on the bike frame. First and second skis may be mounted on the corresponding first and second ski mounts 210A and 210B (e.g., as described above) at any time either prior to or after deploying the rear wheel assembly on the bike frame 15.

With continued reference to FIG. 3, the depicted rear ski assembly 200 further includes first and second, front and back, angled rear support frame members 230A and 230B. It will be understood that while first and second frame members are depicted the disclosed embodiments are not limited in this regard. A single frame member may suffice for certain embodiments or configurations. Vertices 232 of each of the rear frame members 230A, 230B are rotatably coupled to the axle weldment 220 at an upper weldment bore 224 (e.g., via pinning). First ends 234 of the frame members 230A, 230B are rotatably coupled with the first ski mount 210A at the upper bore 214A. Second opposing ends 236 of the frame members 230A, 230B are rotatably coupled with the second ski mount 210B at the upper bore 214B.

The depicted rear ski assembly 200 further includes first and second control arms 240A and 240B. First ends 242A, 242B of each of the arms are rotatably coupled to one another and to the axle weldment 220 at a lower weldment bore 225. A second opposing end 244A of the first control arm 240A is rotatably coupled to the first ski mount at the lower bore 215A while a second opposing end 244B of the second control arm 240B is rotatably coupled to the second ski mount at the lower bore 215B.

With continued reference to FIGS. 2 and 3 it will be appreciated that the various depicted components may be advantageously constructed from strong, lightweight materials, such as an aluminium alloy or a carbon composite material. For example only, the rear support frame members 230A, 230B may be constructed from aluminium alloy tubing. The ski mounts may be constructed from an aluminium alloy C-channel while the control arms and axle weldment may also be constructed from an aluminium alloy. However, it will be appreciated that the disclosed embodiments are in no way limited to the materials of construction of the front and rear ski assemblies 100 and 200.

As noted above in the Background Section, a ski bike may be steered by turning the bike handles and/or leaning the bike into a turn. Leaning the bike into a turn may cause the skis to become angled with respect to the snow covered surface and to therefore cut or carve the snow. Downhill (alpine) skiers routinely rotate their skis to severe angles with respect to the snow (e.g., to angles greater than 45 degrees) when cornering (e.g., while slaloming or otherwise turning sharply). One aspect of the instant invention was the realization that a conventional ski bike does not enable such severe angling of the skis and therefore does not enable sharp cornering or slaloming. In other words it was realized that it is not practical (or even possible) for a rider to tilt or lean a ski bike enough to aggressively angle the skis for sharp cornering. This limits the use of a conventional ski bike to more gradual terrain and to less aggressive skiing in general. The disclosed embodiments are intended to overcome these drawbacks of conventional ski bikes.

Figure 4A:
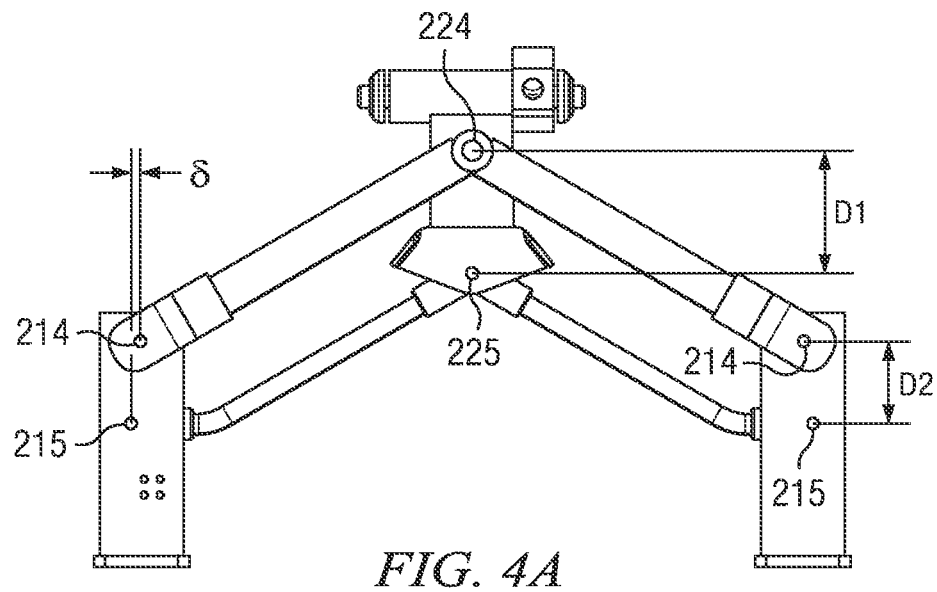
FIGS. 4A and 4B (collectively FIG. 4) depict a front view of the rear ski assembly shown on FIG. 3 in upright (4A) and leaning (4B) positions.
Figure 4B:
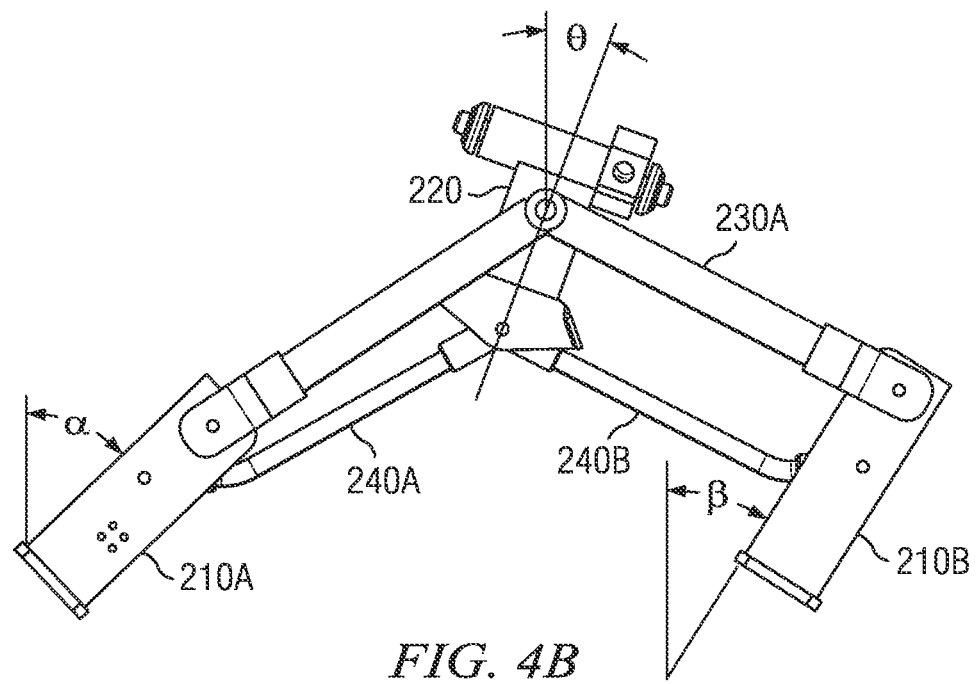

FIGS. 4A and 4B (collectively FIG. 4) depict front views of the rear ski assembly in upright (FIG. 4A) and tilted (or leaning) (FIG. 4B) configurations. In FIG. 4A, the rear support frame member 230 and the first and second control arms 240A and 240B are rotatably coupled to the axle weldment 220 and the first and second ski mounts 210A and 210B as described above. In FIG. 4B, note that the rear ski assembly is rotated (tilted or leaning) at an angle of θ with respect to a vertical direction (e.g., a direction normal to the ground surface). This angle θ represents the tilt angle (or lean angle) of the frame (and rider) with respect to the upright position of the ski bike. The rear ski assembly 200 is configured such that rotation angles α and β of the first and second ski mounts 210A and 210B with respect to the vertical direction are greater than the tilt angle θ. The rear ski assembly 200 may be further optionally configured such that the angle α of the first ski mount 210A is greater than the angle β of the second ski mount 210B (in other words such that the angle of the outside ski is greater than the angle of the inside ski when cornering). Such a configuration is believed to provide for enhanced cornering and carving and to therefore enable more aggressive ski biking (riding).

The above described rotational configuration in which angles α and β are greater than tilt angle θ (as shown on FIG. 4B) may be achieved, for example, as depicted on FIG. 4A. As depicted, a spacing $D_1$ between the centers of upper and lower weldment bores 224 and 225 is greater than a spacing $D_2$ between the centers of the upper and lower ski mount bores 214 and 215. In other words a ratio of the distance $D_1$ to the distance $D_2$ is greater than 1. For example, to achieve a suitable increase in angles α and β the $D_1:D_2$ ratio may be in a range from about 1.1 to about 2 (e.g., from about 1.2 to about 1.8 or from about 1.3 to about 1.7). In one example embodiment the $D_1:D_2$ ratio is about 1.5. It will be appreciated that the ratio need not be fixed. For example, the lower ski mount bores 215 may be elongated in the form of thru slots thereby allowing the coupling position of the ski arms to be adjustable (which in turn results in an adjustable $D_1:D_2$ ratio and an adjustable angle magnification).

The above described rotational configuration in which angle α is greater angle β (as also shown on FIG. 4B) may be achieved, for example, as depicted on FIG. 4A. In the depicted embodiment, the lower ski mount bore 215 is laterally offset from the upper ski mount bore 214 towards the outside edge of the ski mount 210A and 210B by a distance δ. In certain embodiments the distance δ may be in a range from about 0 to about 0.5 inches. For example, to achieve a suitable increase of angle α with respect to angle β a $\delta:D_2$ ratio may be in a range from about 0 to about 0.25 (e.g., from about 0.02 to about 0.2 or from about 0.05 to about 0.15). In one example embodiment the $\delta:D_2$ ratio is about 1:8 (0.125). In another example embodiment the $\delta:D_2$ ratio is about 1:16 (0.0625).

While FIG. 4 depicts one example configuration by which the rear ski mounts 210A and 210B may be tilted at angles (α and β) that exceed the tilt angle of the frame (θ), it will be appreciated that the disclosed embodiments are not limited to the particular configuration depicted. For example, the disclosed embodiments are not limited to the use of spaced apart bores in the ski mounts 210A, 210B to achieve the above-described tilt-angle performance advantages. The disclosed embodiments may employ any suitable configuration so long as the tilt angles α and β of the ski mounts exceed the tilt angle θ of the frame.

Figure 5:
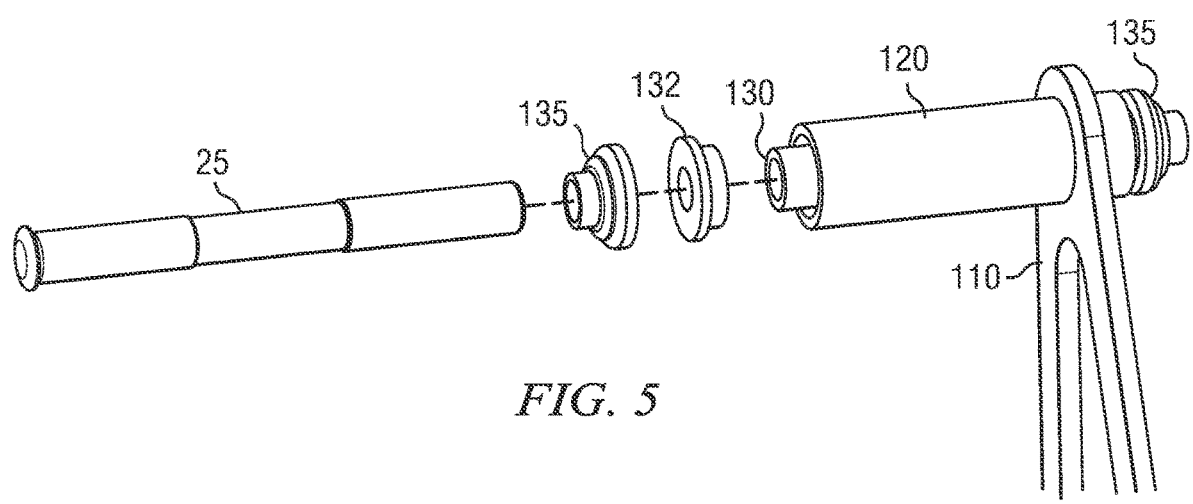
FIG. 5 depicts a partially exploded view of an axle assembly.

FIG. 5 depicts an example assembly for receiving the bicycle axles (front and rear). While the assembly is described with respect to the front ski assembly 100 it is applicable to rear ski assembly mounting as well. The assembly includes an axle support tube 130 (sized and shaped to receive the wheel axle 25) deployed in the axle housing 120 and supported by opposing bushings 132 and end caps 135. When mounting the front ski assembly to the bicycle, the front axle 25 is inserted through the support tube 130 and reconnected to the bike frame (e.g., via conventional quick release connectors). While not depicted, it will be understood that the rear ski assembly 200 may include an identical axle assembly for receiving a rear wheel axle.

Figure 6:
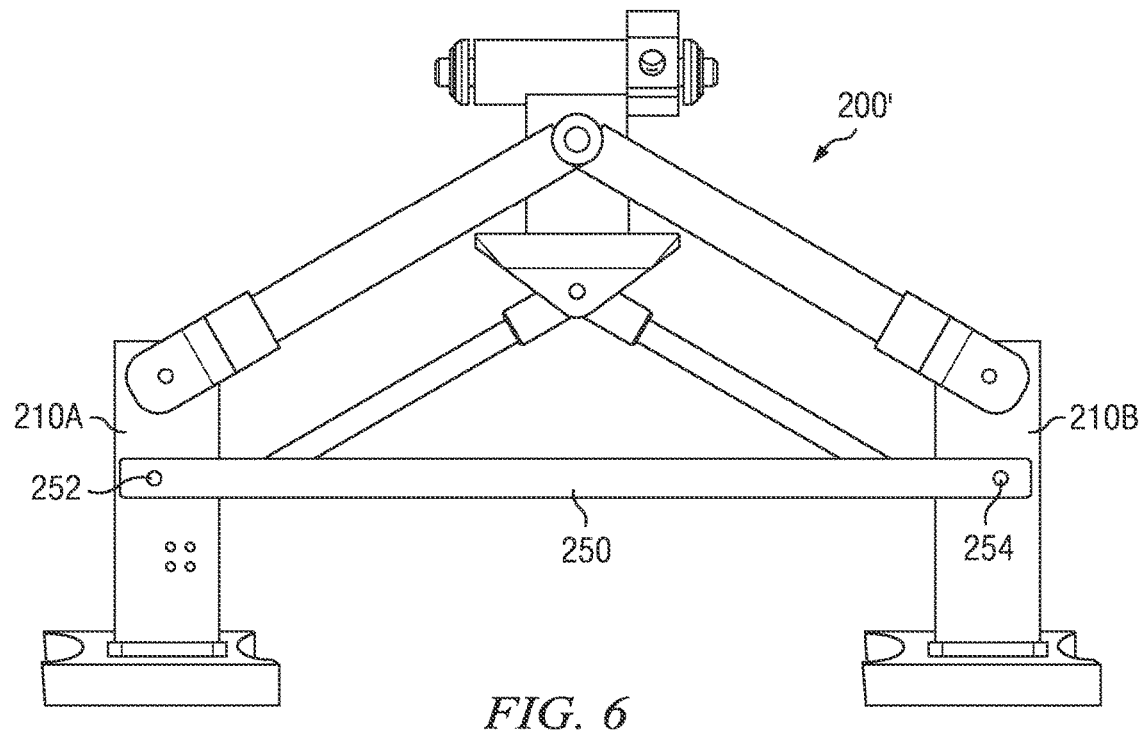
FIG. 6 depicts a perspective view of an alternative rear ski assembly embodiment.

FIG. 6 depicts an alternative rear ski assembly 200' embodiment. The depicted rear ski assembly 200' is essentially identical to rear ski assembly 200 (FIG. 3) with the exception that it further includes an optional limiter bracket 250 rotationally coupled (e.g., pinned) to bores 215 of the first and second ski mounts 210A and 210B. The limiter bracket 250 may include circular or elongated bores 252 and 254 for coupling with the ski mounts 210A and 210B. The limiter bracket is intended to prevent over-rotation (or over-tilt) of the of the ski mounts 210A and 210B when a rider leans into a turn and to further support the rear ski assembly structure (e.g., to prevent the outer ski from over-rotating with respect to the inner ski). It will be appreciated that the use of the limiter bracket is purely optional.

It will be understood that the present disclosure includes numerous embodiments. These embodiments include, but are not limited to, the following embodiments.

In a first embodiment a conversion kit for converting a bicycle into a ski bike comprises a rear ski assembly configured to replace a rear wheel of the bicycle, the rear ski assembly including first and second rear ski mounts configured to receive corresponding first and second skis, an axle weldment including an axle housing configured to receive a rear wheel axle of the bicycle such that the rear ski assembly is deployable on the bicycle in place of the rear wheel, and a rear support frame configured to couple the first and second rear ski mounts to the axle weldment; and a front ski assembly configured to replace a front wheel of the bicycle, a front ski mount configured to receive a third ski, an axle housing configured to receive a front wheel axle of the bicycle such that the front ski assembly is mountable on the bicycle in place of the front wheel, a front frame configured to couple the front ski mount to the axle housing.

A second embodiment may include the first embodiment, wherein the rear support frame and the rear ski mounts are configured and rotatably connected to one another such that tilting the ski bike at an angle θ with respect to a vertical direction causes the first and second ski mounts to tilt at corresponding angles α and β, wherein α and β are both greater than θ.

A third embodiment, may include the second embodiment, wherein the rear support frame and the rear ski mounts are configured and rotatably connected to one another such that α is greater than β, wherein the tilt angle θ tilts the ski bike away from the first ski mount and towards the second ski mount.

A fourth embodiment, may include any one of the first through third embodiments, wherein the rear ski assembly is mounted on the bike frame in place of a rear wheel and the front ski assembly is mounted on the bike frame in place of a front wheel.

A fifth embodiment may include the fourth embodiment, further comprising first and second skis coupled to the first and second rear ski mounts and a third ski coupled to the front ski mount.

In a sixth embodiment, a rear ski assembly is configured for mounting to a bike frame in place of a rear wheel and comprises first and second ski mounts configured to receive corresponding first and second skis; and a support frame configured to couple the ski mounts to the bike frame in place of the rear wheel, the support frame and the ski mounts configured and rotatably connected to one another such that tilting the ski bike at an angle θ with respect to a vertical direction causes the first and second ski mounts to tilt at corresponding angles α and β with respect to the vertical direction, wherein α and β are both greater than θ.

A seventh embodiment may include the sixth embodiment, wherein the tilt angle α of the first ski mount is greater than the tilt angle β of the second rear ski mount.

An eighth embodiment may include any one of the sixth through seventh embodiments, wherein each of the ski mounts includes corresponding first and second, upper and lower ski mount bores; the support frame is angled, a first a first end of the support frame rotatably coupled with the first ski mount at the corresponding upper ski mount bore, a second opposing end of the support frame rotatably coupled with the second ski mount at the corresponding upper ski mount bore, and a vertex of the support frame rotatably coupled to an axle weldment at an upper weldment bore; the axle weldment includes an axle housing configured to receive a rear wheel axle such that the rear ski assembly is deployable on the bike frame in place of the rear wheel, the axle weldment further including a lower weldment bore; and a distance between the upper and lower weldment bores is greater than a distance between the upper and lower ski mount bores.

A ninth embodiment may include the eighth embodiment, further comprising: first and second control arms, a first end of each of the first and second control arms rotatably coupled to one another and to the axle weldment at the lower weldment bore, a second opposing end of the first control arm rotatably coupled to the first ski mount at the corresponding lower ski mount bore and a second opposing end of the second control arm rotatably coupled to the second ski mount at the corresponding lower ski mount bore.

A tenth embodiment may include any one of the eighth through ninth embodiments, wherein a ratio of the distance between the upper and lower weldment bores to the distance between the upper and lower ski mount bores is in a range from about 1.1 to about 2.

An eleventh embodiment may include any one of the eighth through tenth embodiments, wherein the lower ski mount bores are laterally offset from the corresponding upper ski mount bores by an offset distance towards an outside edge of the ski mounts.

A twelfth embodiment may include the eleventh embodiment, wherein a ratio of the offset distance to the distance between the upper and lower ski mount bores is in a range from about 0.02 to about 0.2.

In a thirteenth embodiment a ski bike comprises a bike frame; a rear ski assembly coupled to the bike frame in place of a rear wheel, the rear ski assembly including first and second rear ski mounts configured to receive corresponding first and second skis and a rear support frame configured to couple the ski mounts to the bike frame, the rear support frame and the rear ski mounts configured and rotatably connected to one another such that tilting the ski bike at an angle θ with respect to a vertical direction causes the first and second ski mounts to tilt at corresponding angles α and β, wherein α and β are both greater than θ; and a front ski assembly coupled to the bike frame in place of a rear wheel, the front ski assembly including a front ski mount configured to receive a third ski and a frame configured to couple the front ski mount to the bike frame.

A fourteenth embodiment may include the thirteenth embodiment, further comprising: first and second skis coupled to the first and second ski rear mounts; and a third ski coupled to the front ski mount.

A fifteenth embodiment may include any one of the thirteenth through fourteenth embodiments, wherein the rear ski assembly is pinned to the bike frame via a rear axle; and the front ski assembly is pinned to the bike frame via a front axle.

A fifteenth embodiment may include any one of the thirteenth through fourteenth embodiments, wherein each of the rear ski mounts includes corresponding first and second, upper and lower ski mount bores; the rear support frame is angled, a first a first end of the support frame rotatably coupled with the first rear ski mount at the corresponding upper ski mount bore, a second opposing end of the support frame rotatably coupled with the second rear ski mount at the corresponding upper ski mount bore, and a vertex of the support frame rotatably coupled to an axle weldment at an upper weldment bore; the axle weldment includes an axle housing configured to receive the rear axle such that the rear ski assembly is deployable on the bike frame in place of the rear wheel, the axle weldment further including a lower weldment bore; and a distance between the upper and lower weldment bores is greater than a distance between the upper and lower ski mount bores.

A seventeenth embodiment may include the sixteenth embodiment, wherein the rear ski assembly further comprises first and second control arms, a first end of each of the first and second control arms rotatably coupled to one another and to the axle weldment at the lower weldment bore, a second opposing end of the first control arm rotatably coupled to the first ski mount at the corresponding lower ski mount bore and a second opposing end of the second control arm rotatably coupled to the second ski mount at the corresponding lower ski mount bore.

An eighteenth embodiment may include the seventeenth embodiment, wherein the lower ski mount bores are laterally offset from the corresponding upper ski mount bores by a non-zero offset distance towards an outside edge of the ski mounts.

A nineteenth embodiment may include the eighteenth embodiment, wherein a ratio of the distance between the upper and lower weldment bores to the distance between the upper and lower ski mount bores is in a range from about 1.1 to about 2; and a ratio of the offset distance to the distance between the upper and lower ski mount bores is in a range from about 0.02 to about 0.2.

A twentieth embodiment may include any one of the thirteenth through nineteenth embodiments, further comprising a limiter bracket rotatably coupled to each of the first and second rear ski mounts.

Although embodiments of a ski bike and ski bike conversion kit have been described in detail, it should be understood that various changes, substitutions and alternations can be made herein without departing from the spirit and scope of the disclosure as defined by the appended claims.

I claim:

1. A conversion kit for converting a bicycle into a ski bike, the kit comprising:
   a rear ski assembly configured to replace a rear wheel of the bicycle, the rear ski assembly including first and second rear ski mounts configured to receive corresponding first and second skis, an axle weldment including an axle housing configured to receive a rear wheel axle of the bicycle such that the rear ski assembly is deployable on the bicycle in place of the rear wheel, and a rear support frame configured to couple the first and second rear ski mounts to the axle weldment; and
   a front ski assembly configured to replace a front wheel of the bicycle, a front ski mount configured to receive a third ski, an axle housing configured to receive a front wheel axle of the bicycle such that the front ski assembly is mountable on the bicycle in place of the front wheel, a front frame configured to couple the front ski mount to the axle housing;
   wherein the rear support frame and the rear ski mounts are configured and rotatably connected to one another such that tilting the ski bike at an angle $\theta$ with respect to a vertical direction causes the first and second ski mounts to tilt at corresponding angles $\alpha$ and $\beta$, wherein $\alpha$ and $\beta$ are both greater than $\theta$.

2. The conversion kit of claim 1, wherein the rear support frame and the rear ski mounts are configured and rotatably connected to one another such that $\alpha$ is greater than $\beta$, wherein the tilt angle $\theta$ tilts the ski bike away from the first ski mount and towards the second ski mount.

3. The conversion kit of claim 1, wherein:
   each of the first and second rear ski mounts includes corresponding first and second, upper and lower ski mount bores;
   the rear support frame is angled, a first end of the rear support frame rotatably coupled with the first rear ski mount at the corresponding upper ski mount bore, a second opposing end of the rear support frame rotatably coupled with the second rear ski mount at the corresponding upper ski mount bore, and a vertex of the support frame rotatably coupled to the axle weldment at an upper weldment bore, the axle weldment further including a lower weldment bore; and
   a distance between the upper and lower weldment bores is greater than a distance between the upper and lower ski mount bores.

4. The conversion kit of claim 3, wherein the rear ski assembly further comprises first and second control arms, a first end of each of the first and second control arms rotatably coupled to one another and to the axle weldment at the lower weldment bore, a second opposing end of the first control arm rotatably coupled to the first ski mount at the corresponding lower ski mount bore and a second opposing end of the second control arm rotatably coupled to the second ski mount at the corresponding lower ski mount bore.

5. The conversion kit of claim 3, wherein the lower ski mount bores are laterally offset from the corresponding upper ski mount bores by a non-zero offset distance towards an outside edge of the ski mounts.

6. A rear ski assembly configured for mounting to a bike frame in place of a rear wheel, the rear ski assembly comprising:
   first and second ski mounts configured to receive corresponding first and second skis; and
   a support frame configured to couple the ski mounts to the bike frame in place of the rear wheel, the support frame and the ski mounts configured and rotatably connected to one another such that tilting the ski bike at an angle $\theta$ with respect to a vertical direction causes the first and second ski mounts to tilt at corresponding angles $\alpha$ and $\beta$ with respect to the vertical direction, wherein $\alpha$ and $\beta$ are both greater than $\theta$.

7. The assembly of claim 6, wherein the tilt angle $\alpha$ of the first ski mount is greater than the tilt angle $\beta$ of the second rear ski mount.

8. The assembly of claim 6, wherein:
   each of the ski mounts includes corresponding first and second, upper and lower ski mount bores;
   the support frame is angled, a first end of the support frame rotatably coupled with the first ski mount at the corresponding upper ski mount bore, a second opposing end of the support frame rotatably coupled with the second ski mount at the corresponding upper ski mount bore, and a vertex of the support frame rotatably coupled to an axle weldment at an upper weldment bore;
   the axle weldment includes an axle housing configured to receive a rear wheel axle such that the rear ski assembly is deployable on the bike frame in place of the rear wheel, the axle weldment further including a lower weldment bore; and
   a distance between the upper and lower weldment bores is greater than a distance between the upper and lower ski mount bores.

9. The assembly of claim 8, further comprising:
   first and second control arms, a first end of each of the first and second control arms rotatably coupled to one another and to the axle weldment at the lower weldment bore, a second opposing end of the first control arm rotatably coupled to the first ski mount at the corresponding lower ski mount bore and a second opposing end of the second control arm rotatably coupled to the second ski mount at the corresponding lower ski mount bore.

10. The assembly of claim 8, wherein a ratio of the distance between the upper and lower weldment bores to the distance between the upper and lower ski mount bores is in a range from about 1.1 to about 2.

11. The assembly of claim 8, wherein the lower ski mount bores are laterally offset from the corresponding upper ski mount bores by a non-zero offset distance towards an outside edge of the ski mounts.

12. The assembly of claim 11, wherein a ratio of the offset distance to the distance between the upper and lower ski mount bores is in a range from about 0.02 to about 0.2.

13. A ski bike comprising:
   a bike frame;
   a rear ski assembly coupled to the bike frame in place of a rear wheel, the rear ski assembly including first and second rear ski mounts configured to receive corresponding first and second skis and a rear support frame configured to couple the ski mounts to the bike frame, the rear support frame and the rear ski mounts configured and rotatably connected to one another such that tilting the ski bike at an angle $\theta$ with respect to a vertical direction causes the first and second ski mounts to tilt at corresponding angles $\alpha$ and $\beta$, wherein $\alpha$ and $\beta$ are both greater than $\theta$; and a front ski assembly coupled to the bike frame in place of a rear wheel, the front ski assembly including a front ski mount configured to receive a third ski and a frame configured to couple the front ski mount to the bike frame.

14. The ski bike of claim 13, further comprising:

first and second skis coupled to the first and second ski rear mounts; and a third ski coupled to the front ski mount.

15. The ski bike of claim 13, wherein:

the rear ski assembly is pinned to the bike frame via a rear axle; and the front ski assembly is pinned to the bike frame via a front axle.

16. The ski bike of claim 13, wherein:

each of the rear ski mounts includes corresponding first and second, upper and lower ski mount bores;

the rear support frame is angled, a first end of the support frame rotatably coupled with the first rear ski mount at the corresponding upper ski mount bore, a second opposing end of the support frame rotatably coupled with the second rear ski mount at the corresponding upper ski mount bore, and a vertex of the support frame rotatably coupled to an axle weldment at an upper weldment bore;

the axle weldment includes an axle housing configured to receive the rear axle such that the rear ski assembly is deployable on the bike frame in place of the rear wheel, the axle weldment further including a lower weldment bore; and a distance between the upper and lower weldment bores is greater than a distance between the upper and lower ski mount bores.

17. The ski bike of claim 16, wherein the rear ski assembly further comprises:

first and second control arms, a first end of each of the first and second control arms rotatably coupled to one another and to the axle weldment at the lower weldment bore, a second opposing end of the first control arm rotatably coupled to the first ski mount at the corresponding lower ski mount bore and a second opposing end of the second control arm rotatably coupled to the second ski mount at the corresponding lower ski mount bore.

18. The ski bike of claim 17, wherein the lower ski mount bores are laterally offset from the corresponding upper ski mount bores by a non-zero offset distance towards an outside edge of the ski mounts.

19. The ski bike of claim 18, wherein:

a ratio of the distance between the upper and lower weldment bores to the distance between the upper and lower ski mount bores is in a range from about 1.1 to about 2; and a ratio of the offset distance to the distance between the upper and lower ski mount bores is in a range from about 0.02 to about 0.2.

20. The ski bike of claim 16, further comprising a limiter bracket rotatably coupled to each of the first and second rear ski mounts at the corresponding first and second lower ski mount bores.

* * * * *